(12) United States Patent
Brouillard et al.

(10) Patent No.: US 6,792,383 B2
(45) Date of Patent: Sep. 14, 2004

(54) PASSIVE RANGING SYSTEM AND METHOD

(75) Inventors: Joseph R. Brouillard, Huntington Beach, CA (US); David E. Bovey, Simi Valley, CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/848,470

(22) Filed: May 3, 2001

(65) Prior Publication Data

US 2002/0173933 A1 Nov. 21, 2002

(51) Int. Cl.$^7$ ............................................... G01C 22/00
(52) U.S. Cl. ..................... 702/158; 702/62; 702/150; 702/152; 702/158; 342/6; 342/14; 342/20; 342/120
(58) Field of Search ......................... 702/60, 62, 150, 702/152, 158, 159, 157, 166, FOR 103, 104, 106, 134, 146, 147, 144, 170; 342/5, 6, 13, 14, 16, 17, 20, 29, 120, 125, 135, 195

(56) References Cited

U.S. PATENT DOCUMENTS 3,939,476 A * 2/1976 Leopard et al. ......... 343/112 R
4,433,334 A * 2/1984 Caputi, Jr. .................. 343/450
4,746,924 A * 5/1988 Lightfoot ..................... 342/453
6,225,941 B1 * 5/2001 Gogineni et al. ............. 342/22

* cited by examiner

Primary Examiner—Marc S. Hoff
Assistant Examiner—Elias Desta
(74) Attorney, Agent, or Firm—Leonard A. Alkov; Glenn H. Lenzen, Jr.

(57) ABSTRACT

A system and method for ascertaining the range of a noise-jamming target. The system includes a receiver; a data processor coupled to the receiver; and software adapted for execution by the data processor for computing rage to a target transmitter using first and second assumptions with respect to the output power level thereof and interpolating with respect to an error term calculated with respect thereto. The method includes the steps of: making assumptions with respect to an output power level of a transmitter located at the target; measuring a level of power received form the transmitter by a receiver at first and second distances relative to the transmitter; calculating an error term with respect to the assumptions; interpolating with respect to the error term to make a range calculation; and outputting the range calculation when the error term reaches a predetermined threshold.

12 Claims, 4 Drawing Sheets

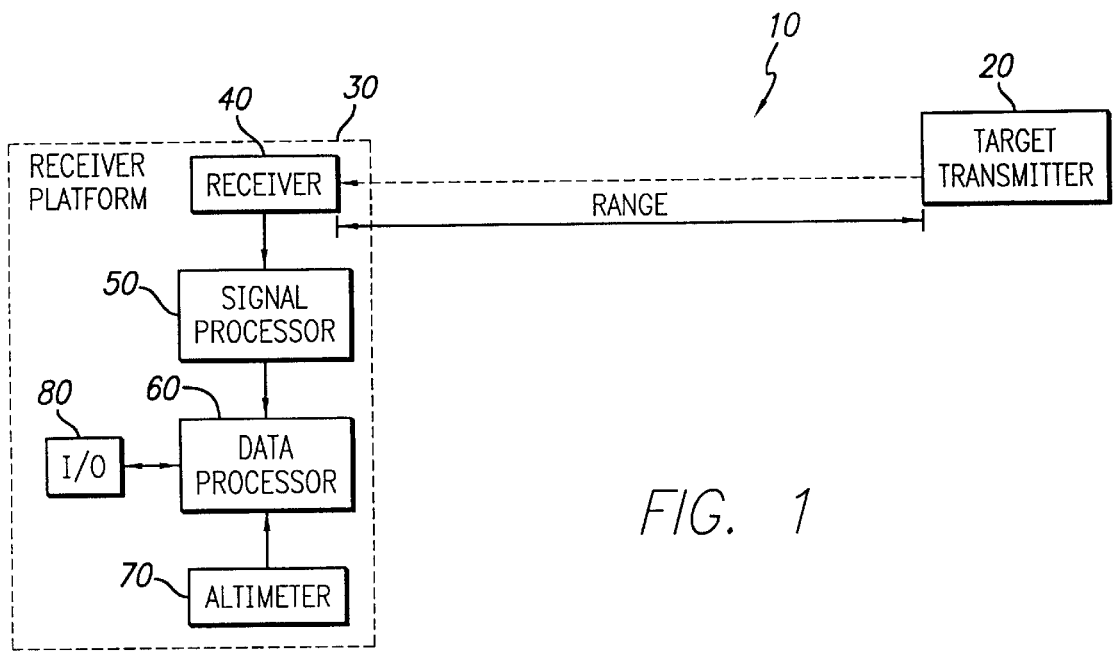
FIG. 1
FIG. 3   ADR Geometry
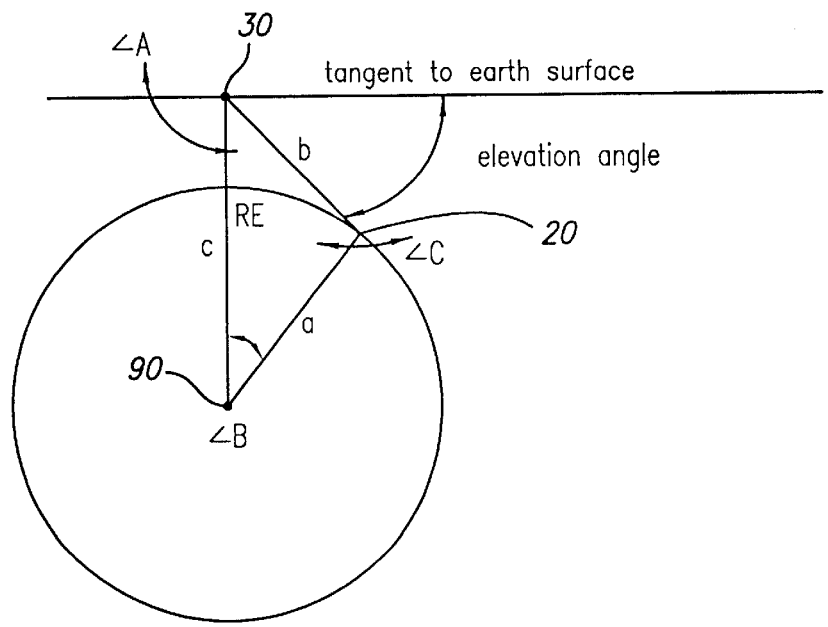
a=RE+HT    earth radius+target altitude
b=range    to solve for
c=RE+HI    earth radius+reference altitude
A=90-EL    compliment of elevation angle

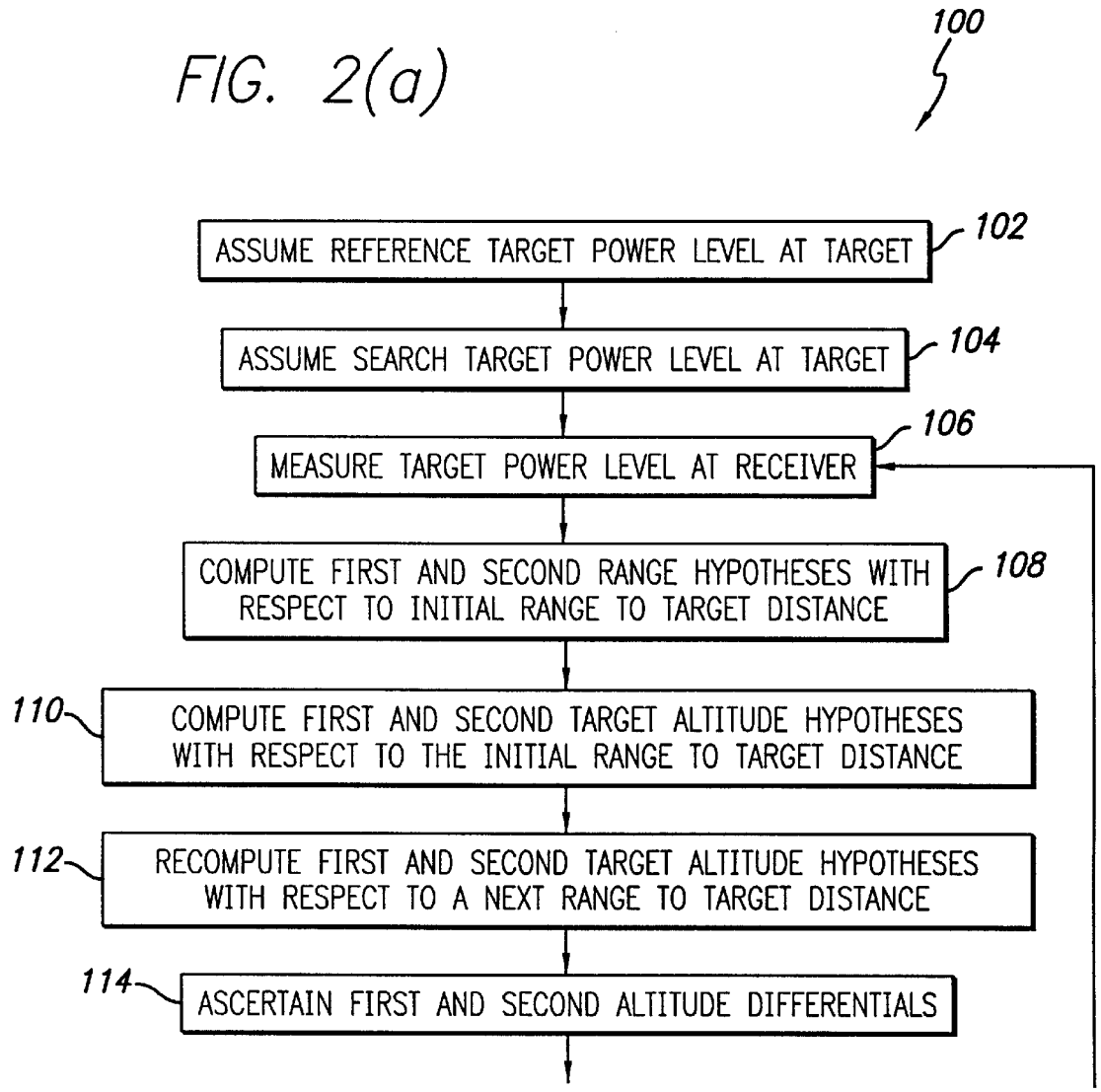

FIG. 4

| 5000 Pwr RNG | 16.0 PWR ALT | ΔAlt | 4000 Pwr RNG | 12.8 PWR ALT | ΔAlt | 3000 Pwr RNG | 9.6 PWR ALT | ΔAlt | Err-Term | Range | Alt | ΔAlt |
|---|---|---|---|---|---|---|---|---|---|---|---|---|
| 111.80 | 25574 |  |  |  |  |  |  |  |  |  |  |  |
| 111.25 | 25562 | −11.6 | 100.00 | 25000 | 0.0 |  |  |  |  |  |  |  |
| 110.69 | 25550 | −11.6 | 99.50 | 25000 | 0.0 |  |  |  |  |  |  |  |
| 110.13 | 25539 | −11.5 | 99.00 | 25000 | 0.0 |  |  |  |  |  |  |  |
| 109.57 | 25527 | −11.5 | 98.50 | 25000 | 0.0 |  |  |  |  |  |  |  |
| 109.01 | 25516 | −11.4 | 98.00 | 25000 | 0.0 | 86.60 | 24646 | 10.2 | −0.466847 | 99.4 | 24997 | 0.0 |
| 108.45 | 25505 | −11.3 | 97.50 | 25000 | 0.0 | 86.17 | 24656 | 10.1 | −0.466685 | 98.9 | 24997 | 0.0 |
| 107.89 | 25493 | −11.3 | 97.00 | 25000 | 0.0 | 85.74 | 24667 | 10.1 | −0.466852 | 98.4 | 24997 | 0.0 |
| 107.33 | 25482 | −11.2 | 96.50 | 25000 | 0.0 | 85.30 | 24677 | 10.0 | −0.466855 | 97.9 | 24997 | 0.0 |
| 106.77 | 25471 | −11.2 | 96.00 | 25000 | 0.0 | 84.87 | 24687 | 10.0 | −0.466857 | 97.4 | 24997 | 0.0 |
| 106.21 | 25460 | −11.1 | 95.50 | 25000 | 0.0 | 84.44 | 24697 | 10.0 | −0.466686 | 96.9 | 24997 | 0.0 |
| 105.66 | 25449 | −11.1 | 95.00 | 25000 | 0.0 | 84.01 | 24707 | 9.9 | −0.466862 | 96.4 | 24997 | 0.0 |
| 105.10 | 25438 | −11.0 | 94.50 | 25000 | 0.0 | 83.57 | 24717 | 9.9 | −0.466864 | 95.9 | 24997 | 0.0 |
| 104.54 | 25427 | −10.9 | 94.00 | 25000 | 0.0 | 83.14 | 24726 | 9.8 | −0.466866 | 95.4 | 24997 | 0.0 |
| 103.98 | 25416 | −10.9 | 93.50 | 25000 | 0.0 | 82.71 | 24736 | 9.8 | −0.466868 | 94.9 | 24997 | 0.0 |
| 103.42 | 25405 | −10.8 | 93.00 | 24999 | 0.0 | 82.27 | 24746 | 9.7 | −0.466871 | 94.4 | 24997 | 0.0 |
| 102.86 | 25394 | −10.8 | 92.50 | 24999 | 0.0 | 81.84 | 24756 | 9.7 | −0.466873 | 93.9 | 24997 | 0.0 |
| 102.30 | 25384 | −10.7 | 92.00 | 24999 | 0.0 | 81.41 | 24765 | 9.6 | −0.466875 | 93.4 | 24997 | 0.0 |
| 101.74 | 25373 | −10.6 | 91.50 | 24999 | 0.0 | 80.97 | 24775 | 9.6 | −0.466877 | 92.9 | 24998 | 0.0 |
| 101.18 | 25363 | −10.6 | 91.00 | 24999 | 0.0 | 80.54 | 24784 | 9.5 | −0.466878 | 92.4 | 24998 | 0.0 |
| 100.63 | 25352 | −10.5 | 90.50 | 24999 | 0.0 | 80.11 | 24794 | 9.5 | −0.466688 | 91.9 | 24998 | 0.0 |
|  |  |  | 90.00 | 24999 | 0.0 | 79.68 | 24803 | 9.4 | −0.466882 | 91.4 | 24998 | 0.0 |
|  |  |  |  |  |  | 79.24 | 24813 | 9.4 | −0.466884 | 90.9 | 24998 | 0.0 |
|  |  |  |  |  |  | 78.81 | 24822 | 9.3 | −0.466886 | 90.4 | 24998 | 0.0 |
|  |  |  |  |  |  | 78.38 | 24831 | 9.3 | −0.466887 | 89.9 | 24998 | 0.0 |
|  |  |  |  |  |  | 77.94 | 24840 | 9.2 |  |  |  |  |

PASSIVE RANGING SYSTEM AND METHOD

BACKGROUND OF THE INVENTION

1. Field of the Invention

The present invention relates to detection systems. More specifically, the present invention relates to electromagnetic target detection systems such as radar, ladar, sonar and other such systems.

2. Description of the Related Art

Several techniques are currently employed to detect a target utilizing electromagnetic energy such as radar, ladar, sonar and other such systems. Radar involves the transmission of a radio wave pulse which, when reflected by a target provides a return pulse which is received and processed to effectuate target detection.

Unfortunately, a noise jammer may frustrate a radar system. A noise jammer is a source which transmits noise near the transmit frequency of the radar. This noise source impedes the ability of the radar system to detect the type of target or the range thereof. This is problematic inasmuch as it may cause a premature launch of a weapon outside of its range of operation. This forces the use of a smaller weapon launch zone and may lead to a loss of a first shot capability, obviously highly undesirable for military applications.

The current method of obtaining range, when radar range is denied, is based on a conjecture as to the target's altitude. Unfortunately, the range obtained by this method is highly inaccurate as it is based on a supposition of the target's altitude. If a target is several miles away at some unknown range, guessing a target's altitude with any accuracy can be very difficult. At normal closing speeds there is very little time to obtain more accurate estimates and the erroneous estimates can put the aircrew in jeopardy. Further, there is no way for the aircrew to know if the initial conjectures were correct.

Hence, there is a need for a system or method for determining the range of a noise-jamming target.

SUMMARY OF THE INVENTION

The need is addressed by the system and method for ascertaining range of a noise-jamming target of the present invention. Generally, the system includes a receiver; a data processor coupled to the receiver; and software adapted for execution by the data processor for computing range to a target transmitter using first and second assumptions with respect to the output power level thereof and interpolating with respect to an effort term calculated with respect thereto.

The method includes the steps of: making assumptions with respect to an output power level of a transmitter located at the target; measuring a level of power received from the transmitter by a receiver at first and second distances relative to the transmitter; calculating an error term with respect to the assumptions; interpolating with respect to the error term to make a range calculation; and outputting the range calculation when the error term reaches a predetermined threshold.

BRIEF DESCRIPTION OF THE DRAWINGS

FIG. 1 is a block diagram of a system for determining the range of a noise-jamming target in accordance with the teachings of the present invention.

FIG. 3 is diagram illustrative of the operation of the range determining system of the present invention.

FIG. 4 is a table illustrative of data utilized in accordance with the teachings of the present invention.

DESCRIPTION OF THE INVENTION

Figure 2B:
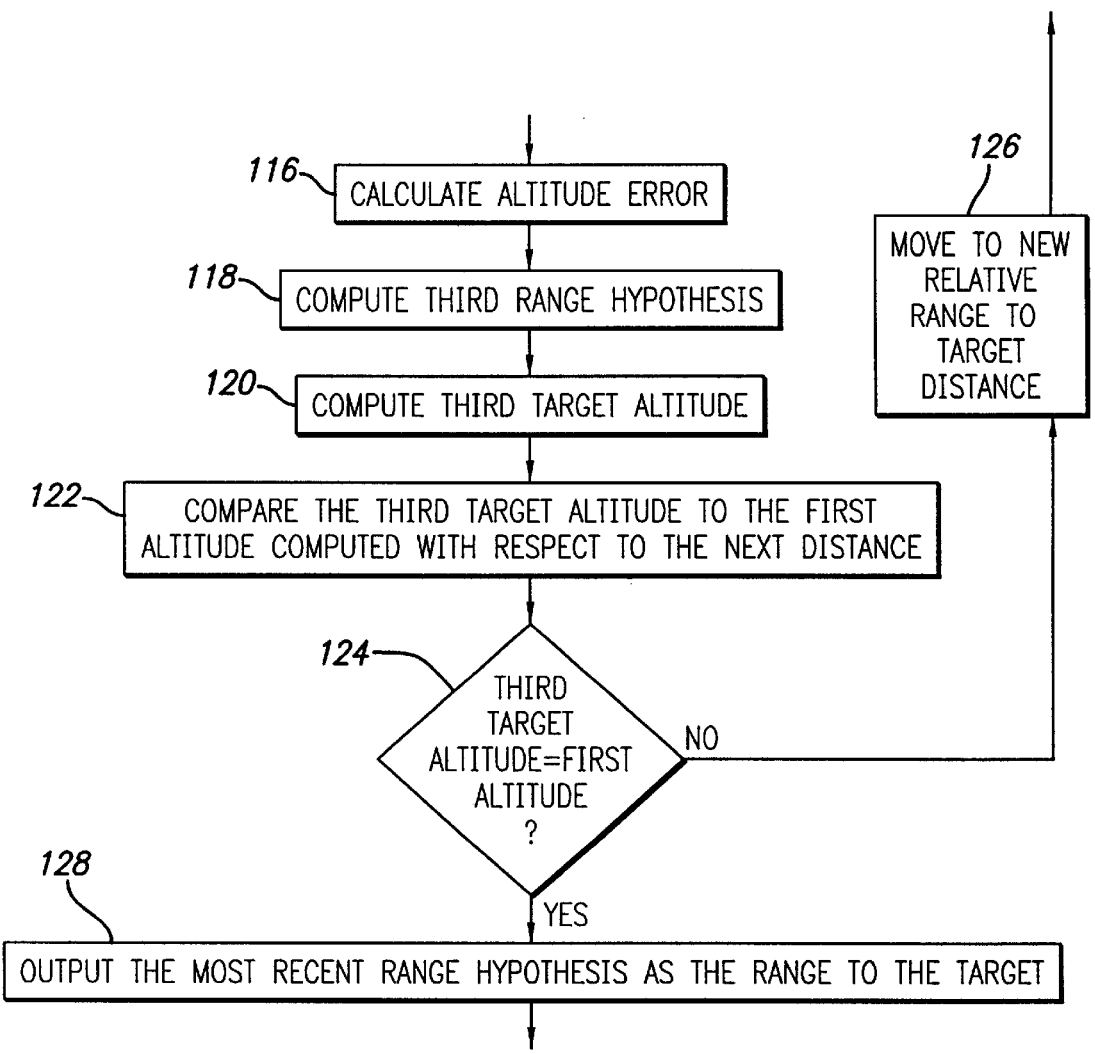
FIG. 2 is a flow diagram of the method for determining the range of a noise-jamming target in accordance with the teachings of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

FIG. 1 is a block diagram of a system for determining the range of a noise-jamming target in accordance with the teachings of the present invention. The system 10 is adapted to determine the range to a noise-jamming target transmitter 20 with respect to a receiver platform 30. In the illustrative application, the noise source 20 is a radar transmitter. However, the present teachings are applicable to ladar, sonar, and other ranging technologies utilizing electromagnetic, acoustic or other energy mediums.

As shown in FIG. 1, in accordance with the present teachings, a receiver 40 is provided on the platform 30. The receiver 40 is adapted to receive energy transmitted from the target transmitter 20 and measure the effective radiated power (ERP) thereof. As is common in the radar art, the output of the receiver 40 is provided to a signal processor 50, which converts and reformats the received signals to a suitable, e.g., digital format. A data processor 60 receives altitude data from an altimeter, implements the method of the present teachings via software and thereby ascertains the range of target transmitter 20. The range is provided to an input/output (I/O) device 80 which, in practice, may be weapon fire control system, a transmitter, or other suitable device.

In operation in accordance with the present teachings, certain assumptions are made:

1. Target is flying at a constant altitude at the time the jammer ERP is being determined.

2. The power received from the jammer is fairly steady from frame to frame. (Less then 2.5 dB)

3. As the receiver platform 30 and the target 20 fly toward each other, the relationship of range, elevation angle, and altitude must remain consistent. That is, if the altitude is to remain constant, the range and elevation angle must keep changing to correspond with a constant altitude. Otherwise, the altitude will develop a rate as will be more apparent from below.

FIG. 2 is a flow diagram of the method for determining the range of a noise jamming target in accordance with the teachings of the present invention. The method of the present invention essentially uses a Regula-Falsi approximation to compute the distance 'b' between the target 20 and the platform 30. This is illustrated in FIG. 3.

FIG. 3 is diagram illustrative of the operation of the range determining system of the present invention. As shown in FIG. 3, the range to solve for 'b' may be computed using c=the earth radius plus the flight altitude times the cosine of the angle A. Angle A is the compliment of the target elevation angle B. The receiver 40 supplies the target elevation angle B and azimuth angle in a conventional manner.

Unfortunately, the location of the target is unknown. Consequently, the right angle at C is not available for the simple computation of 'b' using the cosine law. Consequently, as mentioned above and discussed more fully below, in accordance with the present teachings, the method of the present invention uses the Regula-Falsi approximation to compute the distance 'b' between the target 20 and the platform 30.

Returning to the flow diagram 100 of FIG. 2, the inventive method includes the steps (102) of assuming a reference power level of the target 20 from a first distance relative to the target and (104) assuming a search power level of the source from the first distance. The two different target power levels of Effective Radiated Power (ERP) are assumed in Watts/MHz. The "Reference" assumption is used to compute R1 for range 1. The "Search" assumption is used to compute R2 for range 2. The Reference ERP value is set to a maximum expected value and never varies. The Search ERP value is set near a minimum expected value and will vary as a function of the altitude error term.

Next, the power level of energy received from the target 20 ($P_j$) is measured at the first distance (step 106). Then, at step 108, first and second range hypotheses are computed with respect to the first distance using the measured power level and the reference and search power levels, respectively. In the illustrative embodiment, the range computations are made using the radar range equation:

$$P_J = (\text{Assumed ERP}) * \lambda * G_A / (4\pi R)^2 \quad [1]$$

where:
  $\text{ERP} = P_J * B_W$ watts/MHz
  $P_J$=jammer Power
  $B_W$=Bandwidth
  $\lambda$=Wavelength
  $\pi$=constant
  R=range
  $G_A$=Antenna Gain Then, at step 110, the altitudes H1 and H2 are computed based on the obtained ranges using the round earth quadratic equation and the law of cosines with respect to the first distance to the target:

$$HT = Sqrt(Rng^2 + (RE+HI)^2 - 2*Rng*(RE+HI)^2 * Cos(90+EL)) - RE \quad [2]$$

where:
  HT=Nmi
  HI=Nmi
  RE=3440 Nmi
  EL=elevation angle
  Rng=range

Next, at step 112, the receiver 40 waits until the platform 30 and the target 20 move to a second relative distance and the first and second target altitude hypotheses are recomputed using the first and second range hypotheses, respectively, with respect to a second distance to the target.

At step 114, the first and second target altitude hypotheses with respect to the second distance are subtracted from the first and second target altitude hypotheses with respect to the first distance to ascertain first and second altitude differentials, respectively.

At every new interval, altitude rates ΔH1 and ΔH2 are derived from each interval. Because the relationship between range and altitude is non-linear, Regula-Falsi is used to determine a range3 between the original ranges. As is well-known, the Regula-Falsi Method is a numerical method for estimating the roots of a polynomial f(x). A value x replaces the midpoint in the Bisection Method and serves as the new approximation of a root of f(x). The objective is to make convergence faster.

Next, at step 116, an altitude error term is calculated using the first and second altitude differentials.

$$Err = (0 - \Delta H2)/(\Delta H2 - \Delta H1) \quad [3]$$

where ΔH1 is the first altitude differential and ΔH2 is the second altitude differential.

EXAMPLE $$Err = (0 - \Delta H2)/(\Delta H2 - \Delta H1)$$
$$= (0 - 10.2)/(10.2 - (-11.6))$$
$$= -.466847$$

Next, at step 118, a third range hypothesis, range3, is computed using the following expression:

$$range3 = (R2 + (R2-R1)*err*1f$$

where
  'R1' is the first range hypothesis;
  'R2' is the second range hypothesis;
  'err' is the error term; and
  '1f' is a linearizing factor=6076.115/(2*RE)=1.13, where
    RE=earth radius and
    6076.115 is the number of feet in a nautical mile.

Using the exemplary values:

$$range3 = (R2 + (R2 - R1)*err$$
$$= (86.17 + (86.17 - 111.25)*(-.466847)*1f)$$
$$= 99.42$$

which is only 0.1 Nmi from the exact range at this power (see FIG. 4).

Through the range equation [1], the system 10 computes the ERP to be used by the Search for the next interval. This process continues until range3 of Search gets close to the true range and the altitude rate of the search approaches zero. When the altitude rate of the search reaches zero, the ERP is "locked in" and the ERP is used to compute the range for the remainder of the pass.

Next, at step 120, a new target altitude is computed based on the new range hypothesis. Then, at step 122, the new target altitude is compared to the previous target altitude hypothesis. If, at step 124, the third target altitude differs from the first target altitude, then, at step 126, the platform 30 moves to a third distance relative to the target 20 and steps 106 through 122 are repeated.

If, at step 124, the third target altitude does not differ from the first target altitude, then, at step 128, the system 10 outputs the most recent range hypothesis as the range to the target.

FIG. 4 is a table illustrative of data utilized in accordance with the teachings of the present invention. For example, the reference jammer power level is assumed to be 5000 watts/MHz and the initial jammer search power level is assumed to be 3000 watts/MHz. As shown in FIG. 4, this yields range hypotheses of 111.80 and 86.60 miles respectively. Next, target altitude is calculated for each range yielding 25,574 and 24,646 feet respectively. In the next interval, this process is repeated. The difference altitude between each interval is then determined. The error term is then computed. Using the error term, a third range is computed by the regula-falsi method of interpolation. The third range is then used to compute a third altitude and a third ERP. Not shown in FIG. 4, the third ERP is used to replace the 3000 watts/MHz in the next interval. With the third ERP, the entire process is repeated. With each repetition, all parameters ERP, range, altitude become more accurate relative to the true values. When an altitude difference of "zero" is reached in the search ERP process, the process is complete and the true ERP has been found. It can now be used to track the closing range until a launch zone within the missiles capability is available. The true ERP of 4000 watts/MHz is shown to demonstrate that the difference altitude is always "zero" when the correct ERP has been determined.

Thus, the present invention has been described herein with reference to a particular embodiment for a particular application. Those having ordinary skill in the art and access to the present teachings will recognize additional modifications, applications and embodiments within the scope thereof. For example, while the illustrative embodiment interpolates with respect to power, the inventive method may be implemented using an interpolation with respect to altitude without departing from the scope of the present teachings.

It is therefore intended by the appended claims to cover any and all such applications, modifications and embodiments within the scope of the present invention.

Accordingly,

What is claimed is:

1. A system for ascertaining range of a target including:
   a) means for measuring a power level of energy received from the source at a first distance;
   b) means for computing first and second range hypotheses with respect to the first distance using the measured power level and assumed reference and search power levels, respectively;
   c) means for computing first and second target altitude hypotheses using the first and second range hypotheses, respectively, with respect to the first distance to the target;
   d) means for recomputing first and second target altitude hypotheses using the first and second range hypotheses, respectively, with respect to a second distance to the target;
   e) means for subtracting the first and second target altitude hypotheses with respect to the second distance from the first and second target altitude hypotheses with respect to the first distance to ascertain first and second altitude differentials, respectively;
   f) means for calculating an altitude error term using the first and second altitude differentials;
   g) means for computing a third range hypothesis using the error term;
   h) means for computing a third target altitude based on the third range hypothesis;
   i) means for comparing the third target altitude to the first altitude computed with respect to the second distance; and
   j) means for moving to a third distance to the target, recomputing the target altitude and comparing the target altitude to a previous target altitude if the third target altitude differs from the previous target altitude, otherwise outputting the most recent range hypothesis as the range to the target.

2. The system of claim 1 wherein the means for computing the first and second range hypotheses includes means for calculating the range R using the expression:

$$(\text{Assumed ERP})*\lambda*G_A/(4\pi R)^2 = \text{Measured Power from jammer} \quad [1]$$

where
"Assumed ERP" is the assumed search or reference power level=$P_J*B_W$ watts/MHz;
$P_J$=Source or jammer Power;
$B_W$=Bandwidth of the received energy;
$\lambda$=the wavelength of the source;
$\pi$=constant;
R=range;
$G_A$=Antenna Gain; and
ERP=Effective Radiated Power.

3. The system of claim 1 wherein the means for computing first and second target altitude hypotheses includes means for ascertaining an elevation angle.

4. The system of claim 3 wherein the means for computing first and second target altitude hypotheses includes means for computing the height using the expression:

$$HT=(Rng3+(RE+HI)^2-2*Rng*(RE+HI)2*\text{Cos}(90+EL))^{1/2}-RE \quad [2]$$

where
HT=target altitude
HI=reference altitude
RE=earth radius=3440 Nmi
EL=elevation angle
Rng=range.

5. The system of claim 1 wherein the means for calculating an altitude error includes means for calculating error using the following expression:

$$Err=(0-\Delta H2)/(\Delta H2-\Delta H1)$$

where $\Delta H1$ is the first altitude differential and $\Delta H2$ is the second altitude differential.

6. The system of claim 5 wherein the means for computing a third range hypothesis includes means for calculating range in accordance with the following expression:

$$range3=(R2+(R2-R1)*err*1f \quad [4]$$

where
'R1' is the first range hypothesis;
'R2' is the second range hypothesis;
'err' is the error term; and
'1f' is a linearizing factor=6076.115/(2*RE)=1.13 where RE=earth radius.

7. A method for ascertaining range of a target including the steps of:
   a) assuming a reference power level of a source located at the target from a first distance relative to the target;
   b) assuming a search power level of the source from the first distance;
   c) measuring a power level of energy received from the source at the first distance;
   d) computing first and second range hypotheses with respect to the first distance using the measured power level and the reference and search power levels, respectively;

e) computing first and second target altitude hypotheses using the first and second range hypotheses, respectively, with respect to the first distance to the target;

f) recomputing first and second target altitude hypotheses using the first and second range hypotheses, respectively, with respect to a second distance to the target;

g) subtracting the first and second target altitude hypotheses with respect to the second distance from the first and second target altitude hypotheses with respect to the first distance to ascertain first and second altitude differentials, respectively;

h) calculating an altitude error term using the first and second altitude differentials;

i) computing a third range hypothesis using the error term;

j) computing a third target altitude based on the third range hypothesis;

k) comparing the third target altitude to the first altitude computed with respect to the second distance; and l) if the third target altitude differs from the first target altitude, then moving to a third distance to the target and repeating steps c) through k) otherwise;

m) outputting the most recent range hypothesis as the range to the target.

8. The method of claim 7 wherein the step d) of computing the first and second range hypotheses includes the step of calculating the range R using the expression:

$$(\text{Assumed ERP}) * \lambda * G_A / (4\pi R)^2 = \text{Measured Power from jammer} \quad [1]$$

where
"Assumed ERP" is the assumed search or reference power level
$P_J * B_W$ waifs/MHz;
$P_J$=Source or jammer Power;
$B_W$=Bandwidth of the received energy;
$\lambda$=the wavelength of the source;
$\pi$=constant;
R=range;
$G_A$=Antenna Gain; and
ERP=Effective Radiated Power.

9. The method of claim 7 wherein the step e) of computing first and second target altitude hypotheses includes the step of ascertaining an elevation angle.

10. The method of claim 9 wherein the step e) of computing first and second target altitude hypotheses includes the step of computing the height using the expression:

$$HT = (Rng^2 + (RE+HI)^2 - 2*Rng*(RE+HI)^2 * \text{Cos}(90+EL))^{1/2} - RE \quad [2]$$

where
HT=target altitude
HI=reference altitude
RE=earth radius=3440 Nmi
EL=elevation angle
Rng=range.

11. The method of claim 7 wherein the step h) of calculating an altitude error term is executed in accordance with the following expression:

$$Err = (0 - \Delta H2)/(\Delta H2 - \Delta H1) \quad [3]$$

where $\Delta H1$ is the first altitude differential and $\Delta H2$ is the second altitude differential.

12. The method of claim 11 wherein the step j) of computing a third range hypothesis is executed in accordance with the following expression:

$$range3(R2 + (R2-R1)*err*1f \quad [4]$$

where
'R1' is the first range hypothesis;
'R2' is the second range hypothesis;
'err' is the error term; and
'1f' is a linearizing factor=6076.115/(2*RE)=1.13 where RE=earth radius.

\* \* \* \* \*

UNITED STATES PATENT AND TRADEMARK OFFICE
CERTIFICATE OF CORRECTION

| | | |
|---|---|---|
| PATENT NO. | : 6,792,383 B2 | Page 1 of 1 |
| DATED | : September 14, 2004 | |
| INVENTOR(S) | : Joseph R. Brouillard and David M. Bovey | |

It is certified that error appears in the above-identified patent and that said Letters Patent is hereby corrected as shown below:

<u>Column 1,</u>
Line 3, please add the following:
-- This invention was made with Government support under Contract No. N68936-96-D-0104 awarded by the Department of the Navy. The Government has certain rights in this invention. --.

Signed and Sealed this

Eleventh Day of January, 2005

JON W. DUDAS
*Director of the United States Patent and Trademark Office*